United States Patent
Pandey et al.

(10) Patent No.: US 11,327,222 B2
(45) Date of Patent: May 10, 2022

(54) CUT-OFF SHIFTED OPTICAL FIBRE WITH LARGE EFFECTIVE AREA

(71) Applicant: Sterlite Technologies Limited, Aurangabad (IN)

(72) Inventors: Anand Kumar Pandey, Aurangabad (IN); Apeksha Malaviya, Aurangabad (IN); Malleswara Rao Lanke, Aurangabad (IN); Srinivas Reddy, Aurangabad (IN)

(73) Assignee: STERLITE TECHNOLOGIES LIMITED, Aurangabad (IN)

( * ) Notice: Subject to any disclaimer, the term of this patent is extended or adjusted under 35 U.S.C. 154(b) by 0 days.

(21) Appl. No.: 16/849,526

(22) Filed: Apr. 15, 2020

(65) Prior Publication Data

US 2021/0033782 A1 Feb. 4, 2021

(30) Foreign Application Priority Data

Aug. 2, 2019 (IN) .............................. 201921031253

(51) Int. Cl.
*G02B 6/02* (2006.01)
*G02B 6/028* (2006.01)
*G02B 6/036* (2006.01)

(52) U.S. Cl.
CPC ..... *G02B 6/02019* (2013.01); *G02B 6/02009* (2013.01); *G02B 6/0281* (2013.01); *G02B 6/0285* (2013.01); *G02B 6/0286* (2013.01); *G02B 6/036* (2013.01); *G02B 6/0365* (2013.01); *G02B 6/02266* (2013.01); *G02B 6/03683* (2013.01); *G02B 6/03688* (2013.01)

(58) Field of Classification Search
CPC .............. G02B 6/02019; G02B 6/0281; G02B 6/03683; G02B 6/03688; G02B 6/02266; G02B 6/0286; G02B 6/02009; G02B 6/0365; G02B 6/0285; G02B 6/036
See application file for complete search history.

(56) References Cited

U.S. PATENT DOCUMENTS

| | | | | |
|---|---|---|---|---|
| 6,671,445 B2* | 12/2003 | Bickham | ............ | G02B 6/02009 385/127 |
| 7,689,085 B1* | 3/2010 | Mishra | ............... | G02B 6/02019 385/127 |
| 7,929,818 B1* | 4/2011 | Bickham | .............. | G02B 6/0286 385/124 |
| 8,971,682 B2* | 3/2015 | Evans | ................. | G02B 6/03627 385/124 |
| 9,658,395 B2* | 5/2017 | Borel | ..................... | C03C 13/045 |
| 9,841,555 B2* | 12/2017 | Downie | ............. | G02B 6/02019 |
| 9,846,275 B2* | 12/2017 | Li | ....................... | G02B 6/02023 |
| 2019/0049660 A1* | 2/2019 | Bookbinder | ....... | G02B 6/03644 |

* cited by examiner

Primary Examiner — Ryan A Lepisto

(57) ABSTRACT

The present disclosure provides an optical fibre. The optical fibre includes a core region, a primary trench region and a secondary trench region. The core region has a radius $r_1$. In addition, the core region has a relative refractive index $\Delta_1$. Further, the primary trench region has a relative refractive index $\Delta_3$. Furthermore, the primary trench region has a curve parameter $\alpha_{trench-1}$. Moreover, the secondary trench region has a relative refractive index $\Delta_4$. Also, the secondary trench region has a curve parameter $\alpha_{trench-2}$.

16 Claims, 4 Drawing Sheets

CUT-OFF SHIFTED OPTICAL FIBRE WITH LARGE EFFECTIVE AREA

BACKGROUND OF THE INVENTION

Field of the Invention

The present disclosure relates to the field of optical fibre. Particularly, the present disclosure relates to a cutoff shifted optical fibre with high mode field diameter. The present application is based on, and claims priority from Indian application 201921031253 filed on 2 Aug. 2019, the disclosure of which is hereby incorporated by reference herein.

Description of the Related Art

With the advancement of science and technology, various modern technologies are being employed for communication purposes. One of the most important modern communication technologies is optical fibre communication technology using a variety of optical fibres. Optical fibre is used to transmit information as light pulses from one end to another. The telecommunication industry is continuously striving for designs to achieve high optical signal to noise ratio and low losses. The ongoing research suggests that the optical fibre of G.654.E category is an improved version of G.654.B and an alternative to G.652.D that faces challenges in 400 G transmission in territorial long haul communication due to non-linear effects. In addition, major challenges in 400 G long haul communication are due to non-linear effects, low optical signal to noise ratio and high attenuation.

In light of the above stated discussion, there is a need for an optical fibre that overcomes the above sited drawbacks.

SUMMARY OF THE INVENTION

In an aspect, the present disclosure relates to an optical fiber. The optical fiber includes a core region. In addition, the optical fiber includes a primary trench region. Further, the optical fiber includes a secondary trench region adjacent to the primary trench region. The core region has a radius $r_1$. Furthermore, the core region has a relative refractive index $\Delta_1$. The relative refractive index $\Delta_1$ is in range of about 0 to 0.13. Moreover, the primary trench region has a relative refractive index $\Delta_3$. The primary trench region has a curve parameter $\alpha_{trench-1}$. Also, the secondary trench region has a relative refractive index $\Delta_4$. The secondary trench region has a curve parameter $\alpha_{trench-2}$. Also, the relative refractive index $\Delta$ of the secondary trench region is greater than the relative refractive index $\Delta$ of the primary trench region. Also, the optical fiber has a cable cutoff wavelength up to 1530 nanometer. Also, the optical fiber has attenuation of up to 0.17 dB/km at a wavelength of about 1550 nanometer. The optical fiber has a mode field diameter in range of about 12 micrometer to 13 micrometer. Also, the optical fiber has chromatic dispersion in range of about 17 picosecond per nanometer-kilometer to 23 picosecond per nanometer kilometer at wavelength of about 1550 nanometer. Also, the optical fiber has an effective area in range of about 110 micrometer square to 135 micrometer square. The optical fiber has macrobend loss up to 0.1 decibel per 100 turns corresponding to wavelength of 1625 nanometer at bending radius of about 30 millimeter and macrobend loss up to 0.03 decibel per 100 turns corresponding to wavelength of 1550 nanometer at bending radius of about 30 millimeter.

A primary object of the present disclosure is to provide an optical fibre with low loss.

Another object of the present disclosure is to provide the optical fibre with large mode field diameter.

In an aspect, the present disclosure provides an optical fiber. The optical fiber includes a core region. In addition, the optical fiber includes a primary trench region. Further, the optical fiber includes a secondary trench region adjacent to the primary trench region. The core region has a radius $r_1$. Furthermore, the core region has a relative refractive index $\Delta_1$. The relative refractive index $\Delta_1$ is in range of about 0 to 0.13. Moreover, the primary trench region has a relative refractive index $\Delta_3$. The primary trench region has a curve parameter $\alpha_{trench-1}$. Also, the secondary trench region has a relative refractive index $\Delta_4$. The secondary trench region has curve parameter $\alpha_{trench-2}$.

In an embodiment of the present disclosure, the optical fibre includes a buffer clad region. The buffer clad region separates the core region and the primary trench region.

In an embodiment of the present disclosure, the optical fibre includes a buffer clad region. In addition, the buffer clad region has a relative refractive index profile $\Delta 2$. The relative refractive index $\Delta 2$ is in range of about −0.05 to 0.05. The buffer clad region has a radius $r_2$. The radius $r_2$ is in range of about 6 micrometers to 6.4 micrometer.

In an embodiment of the present disclosure, the optical fibre includes a buffer clad region. The buffer clad region separates the core region and the primary trench region. In addition, the buffer clad region has a relative refractive index $\Delta 2$. The relative refractive index $\Delta 2$ is in range of about −0.05 to 0.05. Further, the buffer clad region has a radius $r_2$. The radius $r_2$ is in range of about 7.3 micrometer to 7.7 micrometer.

In an embodiment of the present disclosure, the optical fibre includes a buffer clad region. The buffer clad region separates the core region and the primary trench region. The buffer clad region has a relative refractive index $\Delta 2$.

In an embodiment of the present disclosure, the core region has a curve parameter $\alpha 1$. The curve parameter $\alpha 1$ is in range of about 6 to 9. The core region has the radius $r_1$ in range of about 4.7 micrometer to 5.1 micrometer. The relative refractive index $\Delta 3$ of the primary trench region is in range of about −0.28 to −0.32. The curve parameter of the primary trench region $\alpha trench-1$ is in range of about 5 to 7. The relative refractive index $\Delta 4$ of the secondary trench region is in range of about −0.41 to −0.45. The curve parameter of the secondary trench region $\alpha trench-2$ is in range of about 6 to 9. The primary trench region has a radius $r_3$. The radius $r_3$ is in range of about 11 micrometer to 13 micrometer. The secondary trench region has a radius $r_4$. The radius $r_4$ is in range of about 23 micrometer to 28 micrometer.

In an embodiment of the present disclosure, the core region has a curve parameter $\alpha 1$. The curve parameter $\alpha 1$ is in range of about 5 to 7. In addition, the core region has the radius $r_1$ in range of about 5.5 micrometer to 5.9 micrometer. The relative refractive index $\Delta 3$ of the primary trench region is in range of about −0.28 to −0.32. The curve parameter of the primary trench region $\alpha trench-1$ is in range of about 5 to 7. The relative refractive index $\Delta 4$ of the secondary trench region is in range of about −0.42 to −0.48. The curve parameter of the secondary trench region $\alpha trench-2$ is in range of about 7 to 9. The optical fibre includes a third trench region. The third trench region is adjacent to the secondary trench region. The relative refractive index $\Delta 5$ of the third trench region is in range of about −0.1 to −0.15. The primary trench region has a radius $r_3$. The radius $r_3$ is in range of about 10 micrometer to 14 micrometer. The secondary trench region has a radius $r_4$. The radius r4 is in range of about 16 micrometer to 20 micrometer. The third trench region has a radius r5. The radius r5 is in range of about 38 micrometer to 42 micrometer.

In an embodiment of the present disclosure, the core region is defined along a central longitudinal axis of the optical fibre.

In an embodiment of the present disclosure, The relative refractive index Δ4 of the secondary trench region is greater than The relative refractive index Δ3 of the primary trench region.

In an embodiment of the present disclosure, the optical fibre includes a cladding region. The cladding region has a radius rclad. The radius rclad of the cladding region is up to 62.5 micrometer. Further, the cladding region has a relative refractive index Δclad of about 0.

In an embodiment of the present disclosure, the optical fibre has a cable cutoff wavelength up to 1530 nanometer. Also, the optical fibre has attenuation of up to 0.17 dB/km at a wavelength of about 1550 nanometer. In addition, the optical fibre has a mode field diameter in range of about 12 micrometer to 13 micrometer. Further, the optical fibre has chromatic dispersion in range of about 17 picosecond per nanometer-kilometer to 23 picosecond per nanometer-kilometer at wavelength of about 1550 nanometer. Furthermore, the optical fibre has an effective area in range of about 110 micrometer square to 135 micrometer square. Moreover, the optical fibre has macrobend loss up to 0.1 decibel per 100 turns corresponding to wavelength of 1625 nanometer at bending radius of about 30 millimeter and macrobend loss up to 0.03 decibel per 100 turns corresponding to wavelength of 1550 nanometer at bending radius of about 30 millimeter.

In another aspect, the present disclosure provides an optical fibre. The optical fibre includes a core region. In addition, the optical fibre includes a primary trench region. Further, the optical fibre includes a secondary trench region adjacent to the primary trench region. The core region has a radius r1. Furthermore, the core region has a relative refractive index Δ1. The relative refractive index Δ1 is in range of about 0 to 0.13. Moreover, the primary trench region has a relative refractive index Δ3. The primary trench region has a curve parameter αtrench-1. Also, the secondary trench region has a relative refractive index Δ4. The secondary trench region has an curve parameter αtrench-2. Also, The relative refractive index Δ4 of the secondary trench region is greater than The relative refractive index Δ3 of the primary trench region. Also, the optical fibre has a cable cutoff wavelength up to 1530 nanometer. Also, The optical fibre has attenuation of up to 0.17 dB/km at a wavelength of about 1550 nanometer. The optical fibre has a mode field diameter in range of about 12 micrometer to 13 micrometer. Also, the optical fibre has chromatic dispersion in range of about 17 picosecond per nanometer-kilometer to 23 picosecond per nanometer kilometer at wavelength of about 1550 nanometer. Also, the optical fibre has an effective area in range of about 110 micrometer square to 135 micrometer square. The optical fibre has macrobend loss up to 0.1 decibel per 100 turns corresponding to wavelength of 1625 nanometer at bending radius of about 30 millimeters and macrobend loss up to 0.03 decibel per 100 turns corresponding to wavelength of 1550 nanometer at bending radius of about 30 millimeters.

BRIEF DESCRIPTION OF FIGURES

Figure 1:
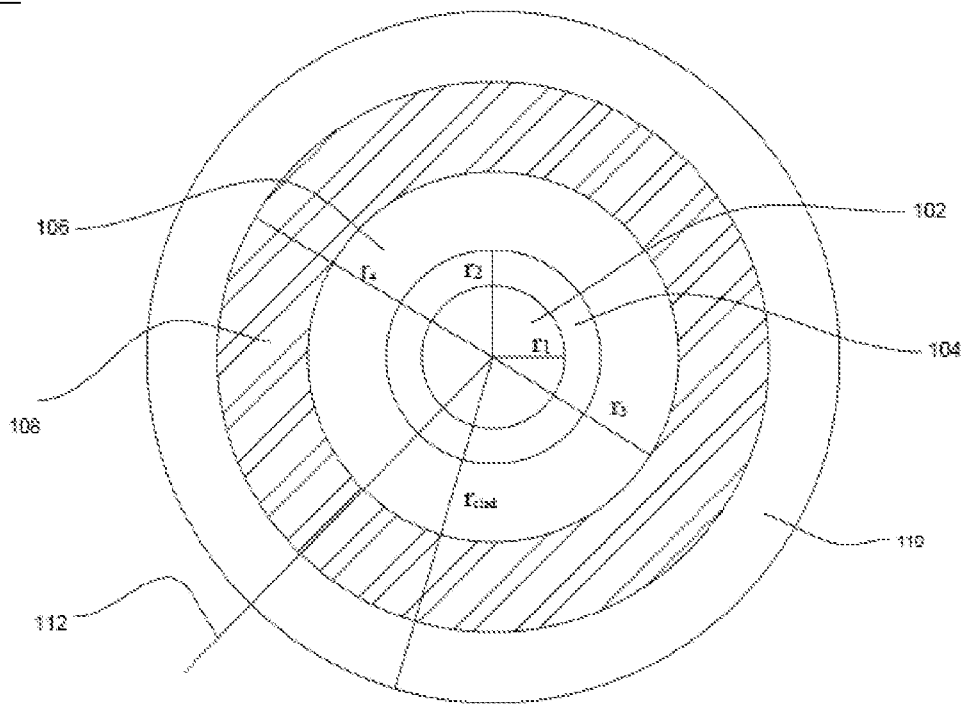
Figure 2:
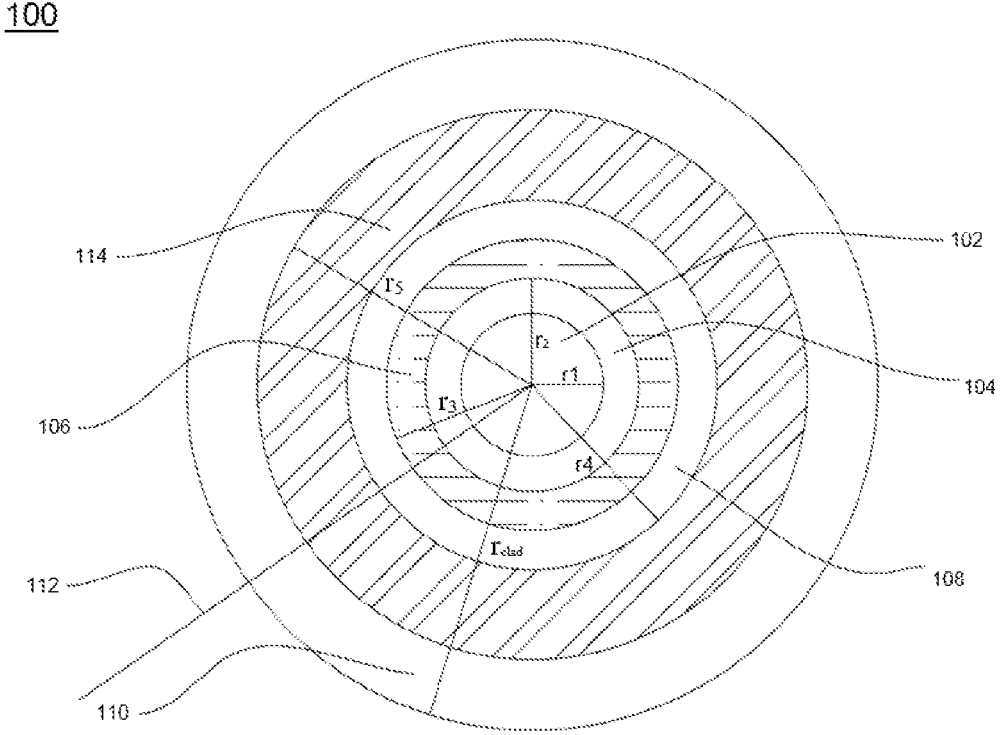
Figure 3:
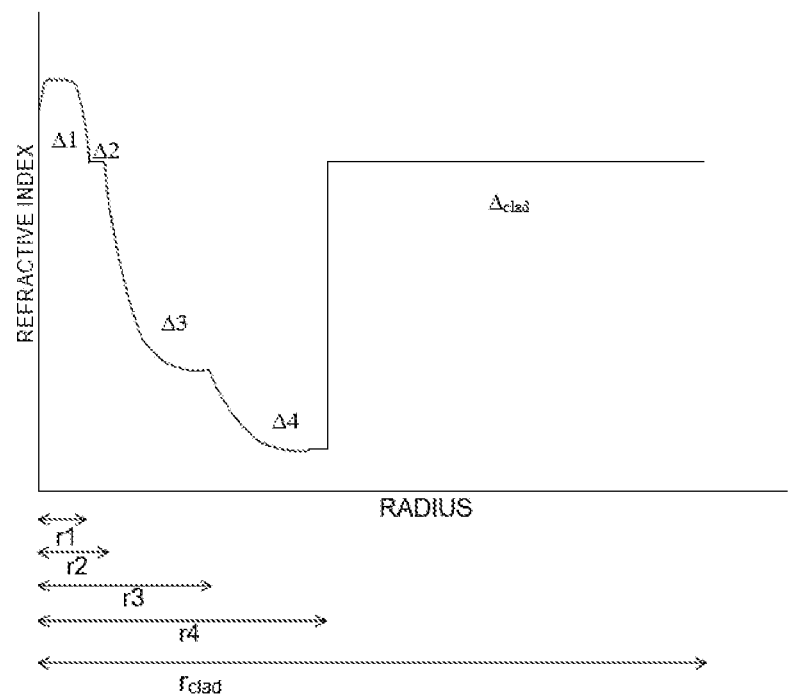
Figure 4:
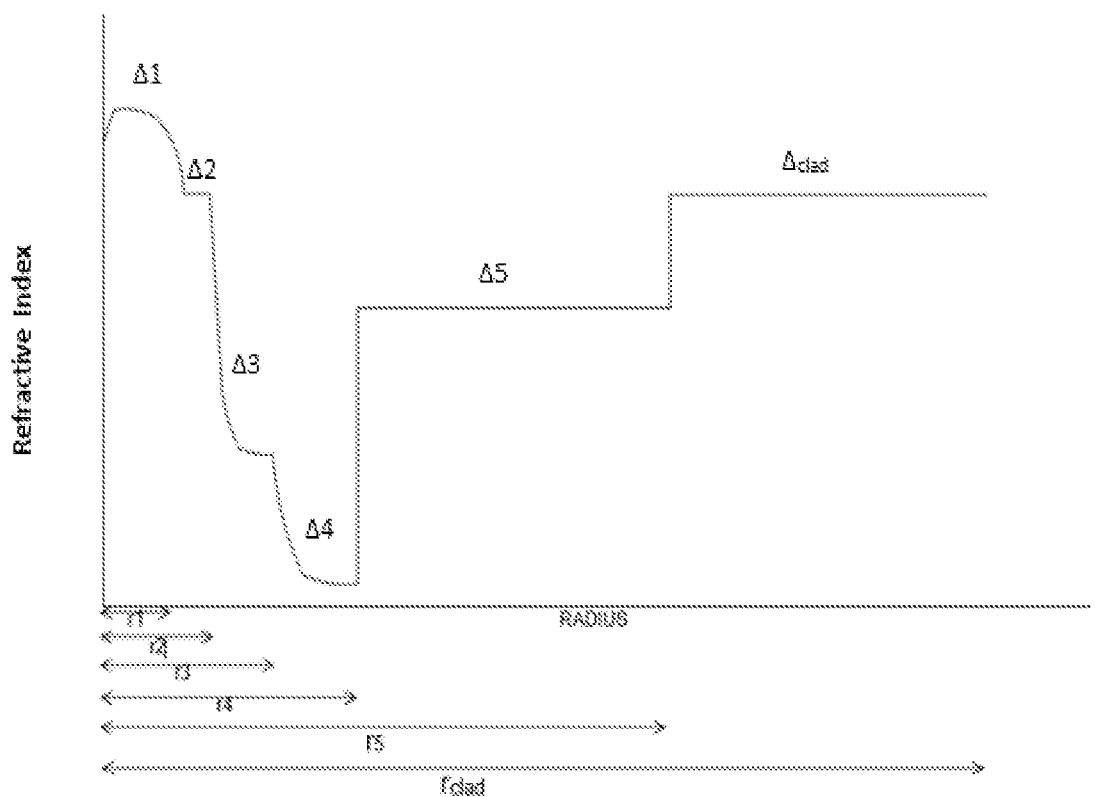

Having thus described the disclosure in general terms, reference will now be made to the accompanying figures, wherein:

FIG. 1 illustrates a cross sectional view of an optical fibre, in accordance with an embodiment of the present disclosure;

FIG. 2 illustrates a cross sectional view of the optical fibre, in accordance with another embodiment of the present disclosure;

FIG. 3 illustrates an example of graph between refractive index and radius of the optical fibre, in accordance with an embodiment of the present disclosure; and FIG. 4 illustrates another example of graph between refractive index and radius of the optical fibre, in accordance with another embodiment of the present disclosure.

It should be noted that the accompanying figures are intended to present illustrations of exemplary embodiments of the present disclosure. These figures are not intended to limit the scope of the present disclosure. It should also be noted that accompanying figures are not necessarily drawn to scale.

DETAILED DESCRIPTION

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced item.

FIG. 1 illustrates a cross-sectional view of an optical fibre 100, in accordance with various embodiments of the present disclosure. In general, optical fibre is a thin strand of glass or plastic capable of transmitting optical signals. In an embodiment of the present disclosure, the optical fibre 100 is configured to transmit information over long distances with high optical signal to noise ratio, low non-linear effects, low latency and low attenuation. The optical fibre 100 of the present disclosure is fully compliant with the requirement of ITU (International Telecommunication Union-Telecommunication Standardization Sector)-G.654 E standards.

In an embodiment of the present disclosure, the optical fibre includes a core region 102. The core region 102 is associated with refractive index profile. The refractive index profile provides relation between refractive index and radius of the optical fiber 102. Moreover, the refractive index of the optical fibre 100 changes with an increase in radius. Further, refractive index profile is modified based on regulation of a plurality of parameters. The plurality of parameters includes but may not be limited to curve parameter alpha, relative refractive index delta and radius. The core region 102 has a curve parameter $\alpha_1$. In general, the curve parameter alpha indicates shape of refractive index profile. The core region 102 has the curve parameter $\alpha_1$ in range of about 6 to 9. In an embodiment of the present disclosure, value of the curve parameter $\alpha_1$ of the core region 102 may vary. In an example, the core region 102 has the curve parameter $\alpha_1$ of about 8. The core region 102 is defined along a central longitudinal axis 112 of the optical fibre 100. In general, longitudinal axis is an imaginary axis passing through center of the optical fibre.

The core region 102 has a relative refractive index $\Delta_1$. The relative refractive index $\Delta_1$ of the core region 102 is in range of about 0 to 0.13. In an embodiment of the present disclosure, The relative refractive index $\Delta_1$ of the core region 102 may vary. In an example, The relative refractive index $\Delta_1$ of the core region 102 is 0.12.

The core region 102 has a first radius $r_1$. The core region 102 has the first radius $r_1$ in range of about 4.7 micrometer to 5.1 micrometer. In an embodiment of the present disclosure, the first radius $r_1$ of the core region 102 may vary. In an example, the core region 102 has the first radius $r_1$ of about 4.9 micrometer.

The optical fibre 100 includes a buffer clad region 104. The buffer clad region 104 separates the core region 102 and the primary trench region 106. The buffer clad region 104 has a relative refractive index $\Delta_2$. The buffer clad region 104 has The relative refractive index $\Delta_2$ in range of about −0.05 to 0.05. In an embodiment of the present disclosure, The relative refractive index $\Delta_2$ of the buffer clad region 104 may vary. The buffer clad region 104 has a radius $r_2$. The radius $r_2$ of the buffer clad region 104 is in range of about 6 micrometer to 6.4 micrometer. In an embodiment of the present disclosure, the radius $r_2$ of the buffer clad region 104 may vary. In an example, the buffer clad region 104 has the radius $r_2$ of about 6.2 micrometer.

The optical fibre 100 includes the primary trench region 106. The primary trench region 106 has a radius $r_3$. The radius $r_3$ of the primary trench region 106 is in range of about 11 micrometer to 13 micrometer. In an embodiment of the present disclosure, the radius $r_3$ of the primary trench region 106 region may vary. In an example, the primary trench region 106 has the radius $r_3$ of about 12 micrometer.

The primary trench region 106 has a relative refractive index $\Delta_3$. The relative refractive index $\Delta_3$ of the primary trench region 106 is in range of about −0.28 to −0.32. In an embodiment of the present disclosure, The relative refractive index $\Delta_3$ of the primary trench region 106 may vary. In an example, The relative refractive index $\Delta_3$ of the primary trench region 106 is about −0.3. The relative refractive index $\Delta_3$ of the primary trench region 106 indicates relative refractive index difference represented by percentage.

The primary trench region 106 has a curve parameter $\alpha_{trench-1}$. The curve parameter $\alpha_{trench-1}$ of the primary trench region 106 is in range of about 5 to 7. In an embodiment of the present disclosure, the curve parameter $\alpha_{trench-1}$ of the primary trench region 106 may vary. In an example, the curve parameter $\alpha_{trench-1}$ of the primary trench region 106 is about 6.

The optical fibre 100 includes a secondary trench region 108. The secondary trench region 108 is adjacent to the primary trench region 106. The secondary trench region 108 has a radius $r_4$. The secondary trench region 108 has the radius $r_4$ in range of about 23 micrometer to 28 micrometer. In an embodiment of the present disclosure, the radius $r_4$ of the secondary trench region 108 may vary. In an example, the secondary trench region 108 has the radius $r_4$ of about 25 micrometer.

The secondary trench region 108 has a relative refractive index $\Delta_4$. The relative refractive index $\Delta_4$ is in range of about −0.41 to −0.45. In an embodiment of the present disclosure, the relative refractive index $\Delta_4$ of the secondary trench region 108 may vary. In an example, the secondary trench region 108 has The relative refractive index $\Delta_4$ of about −0.43. In an embodiment of the present disclosure, The relative refractive index $\Delta_4$ of the secondary trench region 108 is greater than The relative refractive index $\Delta_3$ of the primary trench region 106.

The secondary trench region 108 has a curve parameter $\alpha_{trench-2}$. The secondary trench region 108 has the curve parameter $\alpha_{trench-2}$ in range of about 6 to 9. In an embodiment of the present disclosure, the curve parameter $\alpha_{trench-2}$ of the secondary trench region 108 may vary. In an example, the secondary trench region 108 has curve parameter $\alpha_{trench-2}$ in range of about 8.

The first optical fibre 100 includes a cladding region 110. The cladding region 110 has a radius $r_{clad}$. The cladding region 110 has the radius $r_{clad}$ of up to 62.5 micrometer. In an embodiment of the present disclosure, the radius $r_{clad}$ of the cladding region 110 may vary. The cladding region 110 has a relative refractive index $\Delta_{clad}$. The relative refractive index $\Delta_{clad}$ of the cladding region 110 is of about 0.

The optical fibre 100 has a mode field diameter. The optical fibre 100 has a mode field diameter in range of about 12 micrometer to 13 micrometer at wavelength of about 1550 nanometer. In an embodiment of the present disclosure, the mode field diameter of the optical fibre 100 at wavelength of about 1550 nanometer may vary. In an example, the optical fibre 100 has the mode field diameter of about 12.2 micrometer at wavelength of about 1550 nanometer. In an embodiment, the optical fibre 100 has attenuation of up to 0.17 dB/km at a wavelength of about 1550 nanometer. The optical fibre 100 has chromatic dispersion in range of about 17 picosecond per nanometer-kilometer to 23 picosecond per nanometer-kilometer at wavelength of about 1550 nanometer. In an embodiment of the present disclosure, chromatic dispersion of the optical fibre 100 at wavelength of about 1550 nanometer may vary. In an example, the optical fibre 100 has chromatic dispersion of about 21.5 picosecond per nanometer-kilometer. The optical fibre 100 has chromatic dispersion of up to 29 picosecond per nanometer-kilometer at wavelength of about 1625 nanometer. In an embodiment of the present disclosure, chromatic dispersion of the optical fibre 100 at wavelength of about 1625 nanometer may vary. In an example, the optical fibre 100 has chromatic dispersion of about 26 picosecond per nanometer-kilometer at wavelength of about 1625 nanometer.

The optical fibre 100 has a cable cutoff wavelength up to 1530 nanometer. In an embodiment of the present disclosure, cable cutoff wavelength of the optical fibre 100 may vary. In an example, the optical fibre 100 has the cable cutoff wavelength of about 1480 nanometer. The optical fibre 100 has macrobend loss up to 0.1 decibel per 100 turns corresponding to wavelength of 1625 nanometer at bending radius of about 30 millimeter and macrobend loss up to 0.03 decibel per 100 turns corresponding to wavelength of 1550 nanometer at bending radius of about 30 millimeter. In an example, the optical fibre 100 has the macrobend loss of about 0.01 decibel per 100 turns corresponding to wavelength of 1550 nanometer at bending radius of about 30 millimeter. In an example, the optical fibre 100 has the macrobend loss of about 0.045 decibel per 100 turns corresponding to wavelength of 1625 nanometer at bending radius of about 30 millimeter.

FIG. 2 illustrates a cross sectional view of the optical fibre 100, in accordance with another embodiment of the present disclosure. The optical fibre 100 is a G.654 E single mode optical fibre. However, the optical fibre 100 is not limited to above mentioned optical fibre. In general, optical fibre is used for transmitting information as light pulses from one end to another. In addition, the optical fibre 100 is a thin strand of glass or plastic capable of transmitting optical signals. In general, optical fibre refers to a medium associated with transmission of information over long distances in the form of light pulses. Further, the optical fibre 100 uses light to transmit voice and data communications over long distances. In addition, optical fibres are used in optical fibre cables to transmit information over large distances.

In an embodiment of the present disclosure, the optical fibre 100 is used for 400 G long haul applications. In another embodiment of the present disclosure, the optical fibre 100 is utilized for other applications. In an embodiment of the present disclosure, the optical fibre 100 complies with specific telecommunication standards. The telecommunication standards are defined by International Telecommunication Union-Telecommunication (hereinafter "ITU-T"). In an embodiment of the present disclosure, the optical fibre 100 is compliant with G.654E recommendation standard set by the ITU-T.

The optical fibre 100 includes the core region 102. In an embodiment of the present disclosure, the core region 102 has the radius $r_1$ in range of about 5.5 micrometer to 5.9 micrometer. In another embodiment of the present disclosure, the radius $r_1$ of the core region 102 may vary. In an example, the radius $r_1$ of the core region 102 is of about 5.7 micrometer. The core region 102 has the curve parameter $\alpha_1$. In general, curve parameter alpha indicates shape of refractive index profile. In an embodiment of the present disclosure, the core region 102 has the curve parameter $\alpha_1$ in range of about 5 to 7. In another embodiment of the present disclosure, the curve parameter $\alpha_1$ of the core region 102 may vary. In an example, the core region 102 has the curve parameter $\alpha_1$ of about 6.

The core region 102 has The relative refractive index $\Delta_1$. In an embodiment of the present disclosure, The relative refractive index $\Delta_1$ is in range of about 0 to 0.1. In another embodiment of the present disclosure, The relative refractive index $\Delta_1$ of the core region 102 may vary. In an example, The relative refractive index $\Delta_1$ is of about 0.1.

The optical fibre 100 includes the buffer clad region 104. The buffer clad region 104 separates the core region 102 and the primary trench region 106. The buffer clad region 104 has The relative refractive index $\Delta_2$. The buffer clad region 104 has The relative refractive index $\Delta_2$ in range of about 0. In an embodiment of the present disclosure, The relative refractive index $\Delta_2$ of the buffer clad region 104 may vary. The buffer clad region 104 has the radius $r_2$ in range of about 7.3 micrometer to 7.7 micrometer. In another embodiment of the present disclosure, the radius $r_2$ of the buffer clad region 104 may vary. In an example, the buffer clad region 104 has the radius $r_2$ of about 7.5 micrometer.

The optical fibre 100 includes the primary trench region 106. The primary trench region 106 has the radius $r_3$. The radius $r_3$ of the primary trench region 106 is in range of about 10 micrometer to 14 micrometer. In an embodiment of the present disclosure, the radius $r_3$ of the primary trench region 106 may vary. In an example, the primary trench region 106 has the radius $r_3$ of about 12 micrometer.

The primary trench region 106 has a relative refractive index $\Delta 3$. The relative refractive index $\Delta 3$ of the primary trench region 106 is in range of about −0.28 to −0.32. In an embodiment of the present disclosure, The relative refractive index $\Delta 3$ of the primary trench region 106 may vary. In an example, The relative refractive index $\Delta 3$ of the primary trench region 106 is about −0.3.

The primary trench region 106 has a curve parameter $\alpha_{trench-1}$. The curve parameter $\alpha_{trench-1}$ of the primary trench region 106 is in range of about 5 to 7. In an embodiment of the present disclosure, the curve parameter $\alpha_{trench-1}$ of the primary trench region 106 may vary. In an example, the curve parameter $\alpha_{trench-1}$ of the primary trench region 106 is about 6.

The optical fibre 100 includes the secondary trench region 108. The secondary trench region 108 is adjacent to the primary trench region 106. The secondary trench region 108 has a radius $r_4$. The secondary trench region 108 has the radius $r_4$ in range of about 16 micrometer to 20 micrometer. In an embodiment of the present disclosure, the radius $r_4$ of the secondary trench region 108 may vary. In an example, the secondary trench region 108 has the radius $r_4$ of about 18 micrometer.

The secondary trench region 108 has a relative refractive index $\Delta_4$. The relative refractive index $\Delta_4$ is in range of about −0.42 to −0.48. In an embodiment of the present disclosure, the relative refractive index $\Delta_4$ of the secondary trench region 108 may vary. In an example, the secondary trench region 108 has The relative refractive index $\Delta_4$ of about −0.45. In an embodiment of the present disclosure, The relative refractive index $\Delta_4$ of the secondary trench region 108 is greater than The relative refractive index $\Delta_3$ of the primary trench region 106.

The secondary trench region 108 has the curve parameter alpha $\alpha_{trench-2}$. The secondary trench region 108 has the curve parameter alpha $\alpha_{trench-2}$ in range of about 7 to 9. In an embodiment of the present disclosure, the curve parameter alpha $\alpha_{trench-2}$ of the secondary trench region 108 may vary. In an example, the secondary trench region 108 has the curve parameter alpha $\alpha_{trench-2}$ in range of about 8.

The optical fibre 100 includes the third trench region 114. The third trench region 114 is adjacent to the secondary trench region 108. The third trench region 114 has a radius $r_5$. The third trench region 114 has the radius $r_5$ in range of about 38 micrometer to 42 micrometer. In an embodiment of the present disclosure, the radius $r_5$ of the third trench region 114 may vary. In an example, the third trench region 114 has the radius $r_5$ of about 40 micrometer.

The third trench region 114 has a relative refractive index $\Delta_5$. The relative refractive index $\Delta_5$ is in range of about −0.1 to −0.15. In an embodiment of the present disclosure, the relative refractive index $\Delta_5$ of the third trench region 114 may vary. In an example, the third trench region 114 has The relative refractive index $\Delta_5$ of about −0.13.

The optical fibre 100 includes the cladding region 110. The cladding region 110 has the radius $r_{clad}$. The cladding region 110 has the radius $r_{clad}$ of up to 62.5 micrometer. In an embodiment of the present disclosure, the radius $r_{clad}$ of the cladding region 110 may vary. The cladding region 110 has a relative refractive index $\Delta_{clad}$. The relative refractive index $\Delta_{clad}$ of the cladding region 110 is of about 0.

The optical fibre 100 has a mode field diameter. The optical fibre 100 has a mode field diameter in range of about 12 micrometer to 13 micrometer at wavelength of about 1550 nanometer. In an embodiment of the present disclosure, the mode field diameter of the optical fibre 100 at wavelength of about 1550 nanometer may vary. In an embodiment, the optical fibre 100 has attenuation of up to 0.17 dB/km at a wavelength of about 1550 nanometer. In an example, the optical fibre 100 has the mode field diameter of about 12.7 micrometer at wavelength of about 1550. The optical fibre 100 has chromatic dispersion in range of about 17 picosecond per nanometer-kilometer to 23 picosecond per nanometer-kilometer at wavelength of about 1550 nanometer. In an embodiment of the present disclosure, chromatic dispersion of the optical fibre 100 at wavelength of about 1550 nanometer may vary. In an example, the optical fibre 100 has chromatic dispersion of about 22.3 picosecond per nanometer-kilometer. The optical fibre 100 has chromatic dispersion of up to 29 picosecond per nanometer-kilometer at wavelength of about 1625 nanometer. In an embodiment of the present disclosure, chromatic dispersion of the optical fibre 100 at wavelength of about 1625 nanometer may vary. In an example, the optical fibre 100 has chromatic dispersion of about 26.8 picosecond per nanometer-kilometer at wavelength of about 1625 nanometer.

The optical fibre 100 has a cable cutoff wavelength up to 1530 nanometer. In an embodiment of the present disclosure, cable cutoff wavelength of the optical fibre 100 may vary. In an example, the optical fibre 100 has the cable cutoff wavelength of about 1425 nanometer. The optical fibre 100 has macrobend loss up to 0.1 decibel per 100 turns corresponding to wavelength of 1625 nanometer at bending radius of about 30 millimeter and macrobend loss up to 0.03 decibel per 100 turns corresponding to wavelength of 1550 nanometer at bending radius of about 30 millimeter. In an example, the optical fibre 100 has the macrobend loss of about 0.015 decibel per 100 turns corresponding to wavelength of 1550 nanometer at bending radius of about 30 millimeter. In an example, the optical fibre 100 has the macrobend loss of about 0.06 decibel per 100 turns corresponding to wavelength of 1625 nanometer at bending radius of about 30 millimeter.

FIG. 3 illustrates an example of a graph 300 between refractive index and radius of the optical fibre 100, in accordance with an embodiment of the present disclosure. The core region 102 is associated with refractive index profile. In an embodiment of the present disclosure, refractive index profile provides the relation between refractive index and radius of the optical fibre 100. In addition, radius of the core region 102 is in range of about 4.7 micrometer to 5.1 micrometer. Furthermore, the graph 300 illustrates relation between refractive index and radius of the core region 102. Moreover, the refractive index of the optical fibre 100 changes with an increase in radius of the optical fibre 100. Further, refractive index profile is modified based on regulation of a plurality of parameters. The plurality of parameters includes but may not be limited to curve parameter alpha, relative refractive index delta and radius. The curve parameter alpha is a non-dimensional parameter that is indicative of the shape of refractive index profile. The refractive index profile and relative refractive index of the optical fiber is given by the following equations:
Relative Refractive Index is given by, $$\Delta i = [n_i^2 - n_{clad}^2]/2n_i^2$$

Index profile is given by:

$$n(r) = n_{max}\left[1 - 2\Delta 1 \left(\frac{r}{R1}\right)^\alpha\right]^{0.5} \text{ for } r \leq R1$$

$$n(r) = n_{clad} \text{ for } R1 \leq r < R2 \text{ and } r \geq R4$$

$$n(r) = n_{clad} - n_{trench}\left[1 + 2\Delta 3\left(\frac{(R3-r)}{(R3-R2)}\right)^{\alpha_{trench\_1}}\right]^{0.5} \text{ for } R2 \leq r < R3$$

$$n(r) = n_{trench\_1} - n_{trench\_2}\left[1 + 2\Delta 4\left(\frac{(R4-r)}{(R4-R3)}\right)^{\alpha_{trench\_2}}\right]^{0.5} \text{ for } R3 \leq r < R4$$

Here i=1, 2, 3 regions. Region 1 is core region and $n_{max}$ is the maximum refractive index of the core region. Region 2 is buffer clad region and $n_{clad}$ is the refractive index of the pure silica. Region 3 is primary trench region, $n_{trench\_1}$ is the minimum refractive index of the primary trench region. Region 4 is second trench region and $n_{trench\_2}$ is the minimum refractive index of the second trench region.

FIG. 4 illustrates another example of a graph 400 between refractive index and radius of the core region 102 of the optical fibre 100, in accordance with another embodiment of the present disclosure. The core region 102 is associated with refractive index profile. In an embodiment of the present disclosure, refractive index profile provides relation between refractive index and radius of the optical fiber 100. In an embodiment of the present disclosure, the radius $r_1$ of the core region 102 has a value of about 5.7 micrometer. In another embodiment of the present disclosure, the radius $r_1$ of the core region 102 may vary. Furthermore, the graph 400 illustrates relation between refractive index and radius of the fiber. Moreover, the refractive index of the optical fibre 100 changes with an increase in radius of the optical fibre 100. Further, refractive index profile is modified based on regulation of a plurality of parameters. The plurality of parameters includes but may not be limited to curve parameter alpha, relative refractive index delta and radius. The curve parameter alpha is a non-dimensional parameter that is indicative of shape of refractive index profile. The refractive index profile of the optical fibre 100 is given by:

$$n(r) = n_{max}\left[1 - 2\Delta 1\left(\frac{r}{R1}\right)^\alpha\right]^{0.5} \text{ for } r \leq R1$$

$$n(r) = n_{clad} \text{ for } R1 \leq r < R2 \text{ and } r \geq R5$$

$$n(r) = n_{clad} - n_{trench}\left[1 + 2\Delta 3\left(\frac{(R3-r)}{(R3-R2)}\right)^{\alpha_{trench\_1}}\right]^{0.5} \text{ for } R2 \leq r < R3$$

$$n(r) = n_{trench\_1} - n_{trench\_2}\left[1 + 2\Delta 4\left(\frac{(R4-r)}{(R4-R3)}\right)^{\alpha_{trench\_2}}\right]^{0.5} \text{ for } R3 \leq r < R4$$

$$n(r) = n_{trench\_2} - n_{trench\_3}\left[1 + 2\Delta 5\left(\frac{(R5-r)}{(R5-R4)}\right)^{\alpha_{trench\_3}}\right]^{0.5} \text{ for } R4 \leq r < R5$$

Region 1 is core region and $n_{max}$ is the maximum refractive index of the core region. Region 2 is buffer clad region and $n_{clad}$ is the refractive index of the pure silica. Region 3 is primary trench region, $n_{trench\_1}$ is the minimum refractive index of the primary trench region. Region 4 is second trench region and $n_{trench\_2}$ is the minimum refractive index of the second trench region. Region 5 is third trench region and $n_{trench\_3}$ is the minimum refractive index of the third trench region.

The present disclosure provides numerous advantages over the prior art. The present disclosure provides the first optical fibre having the plurality of optical characteristics well below the standard limit recommended by ITU-T. The present disclosure provides the optical fibre with low attenuation, large mode field diameter and low latency. In addition, the present disclosure provides the optical fibre possessing high optical signal to noise ratio along with improved characteristics of optical fibre following the ITU-T G.654E recommendations. Furthermore, the characteristics of the first optical fibre have reduced non-linear effects. In addition, the characteristics of the first optical fibre include but may not be limited to lower attenuation, low latency, large effective area, zero dispersion.

The foregoing descriptions of pre-defined embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation.

What is claimed is:

1. An optical fibre (100) comprising:
   a core region (102), wherein the core region (102) has a radius $r_1$, wherein the core region (102) has a relative refractive index $\Delta_1$, wherein the relative refractive index $\Delta_1$ is in range of 0 to 0.13;
   a primary trench region (106), wherein the primary trench region (106) has a relative refractive index $\Delta_3$, wherein the primary trench region (106) has a curve parameter $\alpha_{trench-1}$; and
   a secondary trench region (108) adjacent to the primary trench region (106), wherein the secondary trench region (108) has a relative refractive index $\Delta_4$, wherein the secondary trench region (108) has a curve parameter alpha $\alpha_{trench-2}$;
   a buffer clad region (104), wherein the buffer clad region (104) separates the core region (102) and the primary trench region (106), wherein the buffer clad region (104) has a relative refractive index $\Delta_2$; and
   a third trench region, wherein the third trench region (114) is adjacent to the secondary trench region (108), wherein the third trench region (114) has a radius $r_5$, wherein the radius $r_5$ of the third trench region (114) is in range of 38 micrometer to 42 micrometer.

2. The optical fibre (100) as claimed in claim 1, wherein the buffer clad region (104) has a relative refractive index $\Delta_2$, wherein the relative refractive index $\Delta_2$ is in range of −0.05 to 0.05, wherein the buffer clad region (104) has a radius $r_2$, wherein the radius $r_2$ is in range of 6 micrometer to 6.4 micrometer.

3. The optical fibre (100) as claimed in claim 1, wherein the buffer clad region (104) has a relative refractive index $\Delta_2$, wherein the relative refractive index $\Delta_2$ is in range of −0.05 to 0.05, wherein the buffer clad region (104) has a radius $r_2$, wherein the radius $r_2$ is in range of 7.3 micrometer to 7.7 micrometer.

4. The optical fibre (100) as claimed in claim 1, wherein the core region (102) has a curve parameter $\alpha_1$, wherein the curve parameter $\alpha_1$ is in range of 6 to 9, wherein the core region (102) has the radius $r_1$ in range of 4.7 micrometer to 5.1 micrometer, wherein the relative refractive index $\Delta_3$ of the primary trench region (106) is in range of −0.28 to −0.32, wherein the relative refractive index $\Delta_4$ of the secondary trench region (108) is in range of −0.41 to −0.45, wherein the primary trench region (106) has a radius $r_3$, wherein the radius $r_3$ is in range of 11 micrometer to 13 micrometer, wherein the secondary trench region (108) has a radius $r_4$, wherein the radius $r_4$ is in range of 23 micrometer to 28 micrometer.

5. The optical fibre (100) as claimed in claim 1, wherein the core region (102) has a curve parameter $\alpha_1$, wherein the curve parameter $\alpha_1$ is in range of 5 to 7, wherein the core region (102) has the radius $r_1$ in range of 5.5 micrometer to 5.9 micrometer, wherein the relative refractive index $\Delta_3$ of the primary trench region (106) is in range of −0.28 to −0.32, wherein the relative refractive index $\Delta_4$ of the secondary trench region (108) is in range of −0.42 to −0.48, wherein the primary trench region (106) has a radius $r_3$, wherein the radius $r_3$ is in range of 10 micrometer to 14 micrometer, wherein the secondary trench region (108) has a radius $r_4$, wherein the radius $r_4$ is in range of 16 micrometer to 20 micrometer.

6. The optical fibre (100) as claimed in claim 1, wherein the relative refractive index $\Delta_4$ of the secondary trench region (108) is greater than the relative refractive index $\Delta_3$ of the primary trench region (106).

7. The optical fibre (100) as claimed in claim 1, further comprising a cladding region (110), wherein the cladding region (110) has a radius $r_{clad}$, wherein the radius $r_{clad}$ of the cladding region (110) is up to 62.5 micrometer, wherein the cladding region (110) has a relative refractive index $\Delta_{clad}$ of 0.

8. The optical fibre (100) as claimed in claim 1, wherein the optical fibre (100) has a cable cutoff wavelength up to 1530 nanometer, wherein the optical fibre (100) has a mode field diameter in range of 12 micrometer to 13 micrometer, wherein the optical fibre (100) has attenuation of up to 0.17 dB/km at a wavelength of 1550 nanometer, wherein the optical fibre (100) has chromatic dispersion in range of 17 picosecond per nanometer-kilometer to 23 picosecond per nanometer-kilometer at wavelength of 1550 nanometer, wherein the optical fibre (100) has an effective area in range of 110 micrometer square to 135 micrometer square, wherein the optical fibre (100) has macrobend loss up to 0.1 decibel per 100 turns corresponding to wavelength of 1625 nanometer at bending radius of 30 millimeter and macrobend loss up to 0.03 decibel per 100 turns corresponding to wavelength of 1550 nanometer at bending radius of 30 millimeter.

9. An optical fibre (100) comprising:
   a core region (102), wherein the core region (102) has a radius $r_1$, wherein the core region (102) has a relative refractive index $\Delta_1$, wherein the relative refractive index $\Delta_1$ is in range of 0 to 0.13;
   a primary trench region (106), wherein the primary trench region (106) has a relative refractive index $\Delta_3$, wherein the primary trench region (106) has a curve parameter $\alpha_{trench-1}$; and
   a secondary trench region (108) adjacent to the primary trench region (106), wherein the secondary trench region (108) has a relative refractive index $\Delta_4$, wherein the secondary trench region (108) has a curve parameter $\alpha_{trench-2}$, wherein the relative refractive index $\Delta_4$ of the secondary trench region (108) is greater than the relative refractive index $\Delta_3$ of the primary trench region (106),
   wherein the optical fibre (100) has a cable cutoff wavelength up to 1530 nanometer, wherein the optical fibre (100) has a mode field diameter in range of 12 micrometer to 13 micrometer, wherein the optical fibre (100) has chromatic dispersion in range of 17 picosecond per nanometer-kilometer to 23 picosecond per nanometer kilometer at wavelength of 1550 nanometer, wherein the optical fibre (100) has an effective area in range of 110 micrometer square to 135 micrometer square, wherein the optical fibre (100) has macrobend loss up to 0.1 decibel per 100 turns corresponding to wavelength of 1625 nanometer at bending radius of 30 millimeter and macrobend loss up to 0.03 decibel per 100 turns corresponding to wavelength of 1550 nanometer at bending radius of 30 millimeter.

10. The optical fibre (100) as claimed in claim 9, further comprising a buffer clad region (104), wherein the buffer clad region (104) separates the core region (102) and the primary trench region (106).

11. The optical fibre (100) as claimed in claim 9, further comprising a buffer clad region (104), wherein the buffer clad region (104) separates the core region (102) and the primary trench region (106), wherein the buffer clad region (104) has a relative refractive index $\Delta_2$, wherein the relative refractive index $\Delta_2$ is in range of −0.05 to 0.05, wherein the buffer clad region (104) has a radius $r_2$, wherein the radius $r_2$ is in range of 6 micrometer to 6.4 micrometer, wherein the core region (102) has a curve parameter $\alpha_1$, wherein the curve parameter $\alpha_1$ is in range of 6 to 9, wherein the core region (102) has the radius $r_1$ in range of 4.7 micrometer to 5.1 micrometer, wherein the relative refractive index $\Delta_3$ of the primary trench region (106) is in range of −0.28 to −0.32, wherein the relative refractive index $\Delta_4$ of the secondary trench region (108) is in range of −0.41 to −0.45, wherein the primary trench region (106) has a radius $r_3$, wherein the radius $r_3$ is in range of 11 micrometer to 13 micrometer, wherein the secondary trench region (108) has a radius $r_4$, wherein the radius $r_4$ is in range of 23 micrometer to 28 micrometer.

12. The optical fibre (100) as claimed in claim 9, further comprising a buffer clad region (104), wherein the buffer clad region (104) separates the core region (102) and the primary trench region (106), wherein the buffer clad region (104) has a relative refractive index $\Delta_2$, wherein the relative refractive index $\Delta_2$ is in range of −0.05 to 0.05, wherein the buffer clad region (104) has a radius $r_2$, wherein the radius $r_2$ is in range of 7.3 micrometer to 7.7 micrometer, wherein the core region (102) has a curve parameter $\alpha_1$, wherein the curve parameter $\alpha_1$ is in range of 5 to 7, wherein the core region (102) has the radius $r_1$ in range of 5.5 micrometer to 5.9 micrometer, wherein the relative refractive index $\Delta_3$ of the primary trench region (106) is in range of −0.28 to −0.32, wherein the relative refractive index $\Delta_4$ of the secondary trench region (108) is in range of −0.42 to −0.48, wherein the primary trench region (106) has a radius $r_3$, wherein the radius $r_3$ is in range of 10 micrometer to 14 micrometer, wherein the secondary trench region (108) has a radius $r_4$, wherein the radius $r_4$ is in range of 16 micrometer to 20 micrometer.

13. The optical fibre (100) as claimed in claim 9, further comprising a buffer clad region (104), wherein the buffer clad region (104) separates the core region (102) and the primary trench region (106), wherein the buffer clad region (104) has a relative refractive index $\Delta_2$.

14. The optical fibre (100) as claimed in claim 9, wherein the core region (102) is defined along a central longitudinal axis (112) of the optical fibre (100).

15. The optical fibre (100) as claimed in claim 9, further comprising a third trench region (114), wherein the third trench region (114) is adjacent to the secondary trench region (108), wherein the third trench region (114) has a radius $r_5$, wherein the radius $r_5$ of the third trench region (114) is in range of 38 micrometer to 42 micrometer.

16. The optical fibre (100) as claimed in claim 9, further comprising a cladding region (110), wherein the cladding region (110) has a radius $r_{clad}$, wherein the radius $r_{clad}$ of the cladding region (110) is up to 62.5 micrometer, wherein the cladding region (110) has a relative refractive index $\Delta_{clad}$ of 0.

* * * * *